Aug. 25, 1942.   B. KUNTZ   2,294,188
CLUTCH RELEASE FOR TRACTORS
Filed Sept. 21, 1940   2 Sheets-Sheet 1
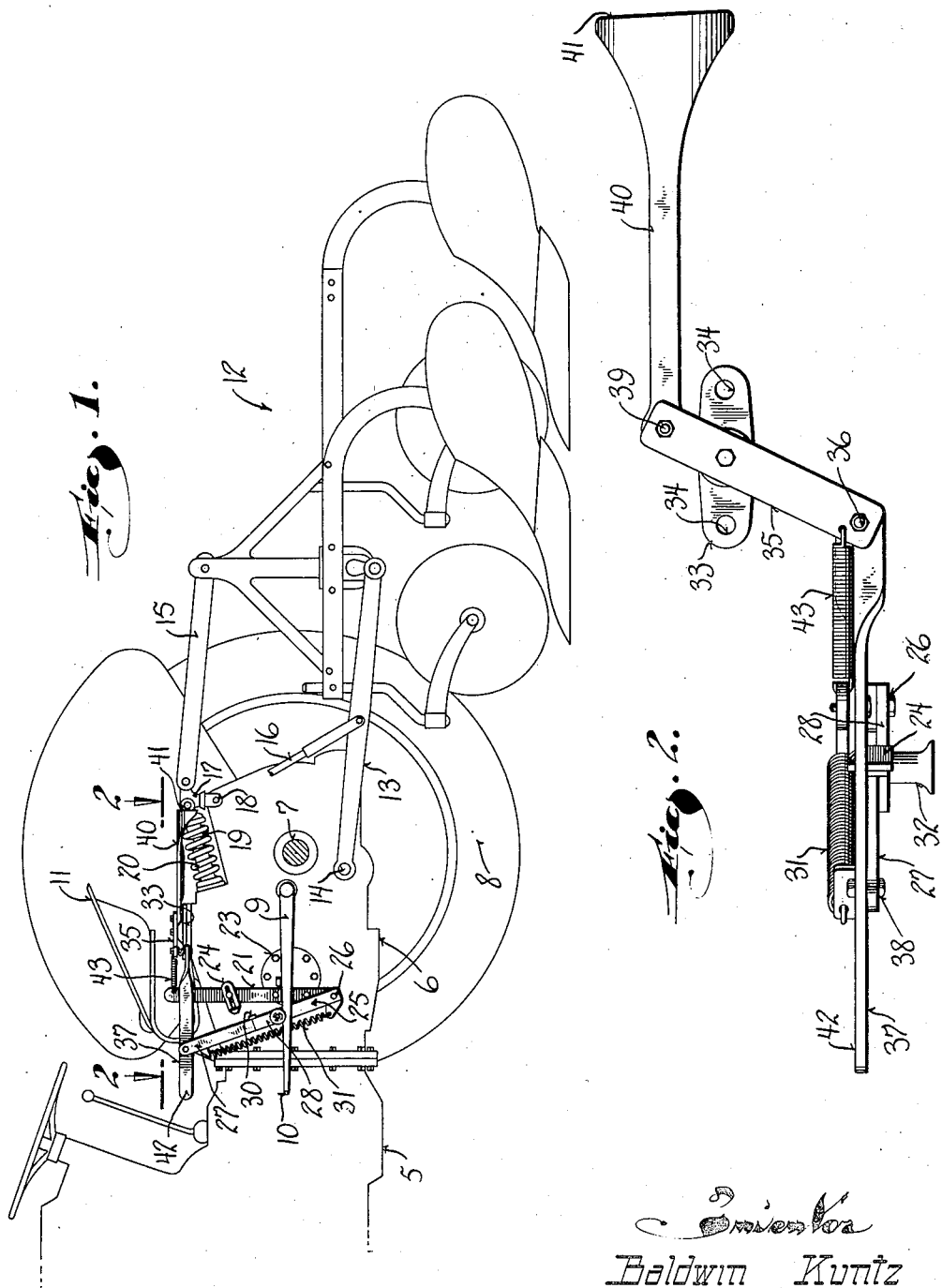
Inventor
Baldwin Kuntz Aug. 25, 1942.　　　　B. KUNTZ　　　　2,294,188
CLUTCH RELEASE FOR TRACTORS
Filed Sept. 21, 1940　　　　2 Sheets-Sheet 2

Inventor
Baldwin Kuntz

Patented Aug. 25, 1942

2,294,188

UNITED STATES PATENT OFFICE 2,294,188

CLUTCH RELEASE FOR TRACTORS

Baldwin Kuntz, Juneau, Wis.

Application September 21, 1940, Serial No. 357,718

8 Claims. (Cl. 180—14.5)

This invention relates broadly to tractors and refers particularly to a safety device by which the clutch of the tractor is automatically disengaged upon the application of an abnormal load on the tractor.

Such safety devices are not broadly new, but heretofore they have invariably necessitated their being built into the tractor hitch so that they constituted a part thereof. The expense and complexity of such past forms of clutch releases have dissuaded their use. Consequently, the danger to the operator and the equipment resulting from sudden overloads on the tractor as when the plow or other implement being drawn by the tractor strikes a root or boulder, is still prevalent.

It is therefore an object of the present invention to provide a safety clutch release capable of instantaneously disengaging the clutch of the tractor upon the occurrence of an overload such as described, and to provide a device for this purpose which may be applied to the tractor as an attachment.

It is also an object of this invention to provide a clutch release of the character described which not only is inexpensive, but so simple that any farmer can apply the same to his tractor, providing, of course, that the tractor is of the type for which the attachment is designed.

With the above and other objects in view, which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate one complete example of the physical embodiment of the invention constructed in accordance with the best mode so far devised for the practical application of the principles thereof, and in which:

Figure 1 is a side view of the rear portion of a tractor and of a plow hitched thereto and illustrating the application of this invention, the near side traction wheel being removed and its axle shaft being in section;

Figure 2 is a top plan view of the clutch release attachment per se, said view being taken on the plane of the line 2—2 in Figure 1;

Figure 3:
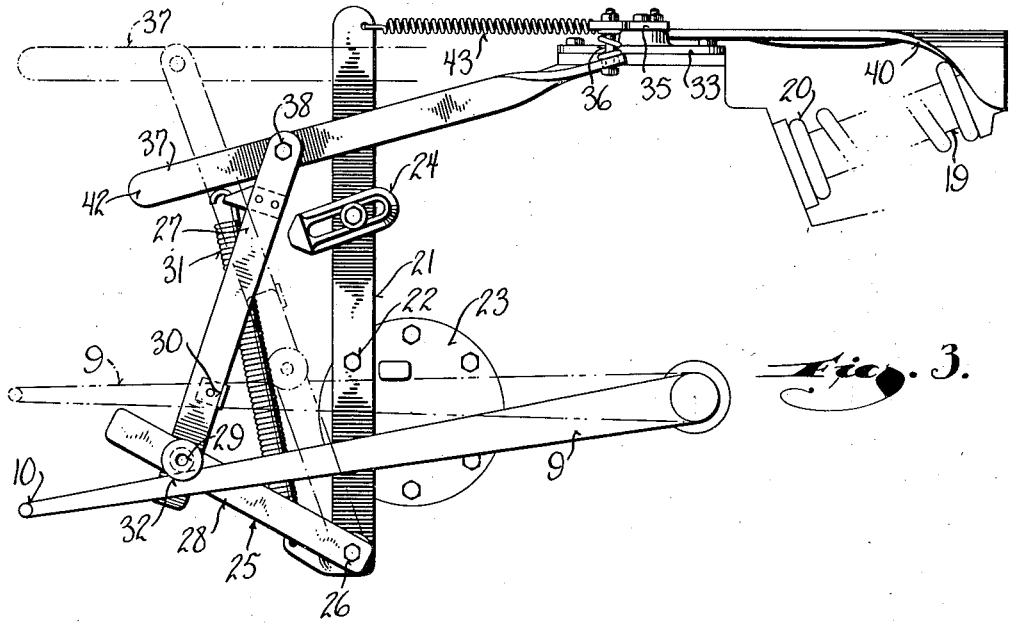
Figure 3 is a side view of the attachment showing the parts in their positions at the time the clutch is disengaged.
Figure 4:
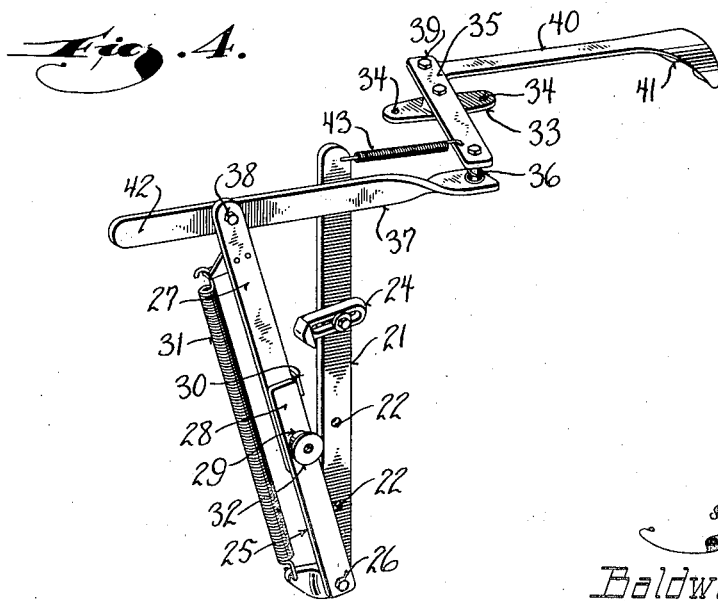
Figure 4 is a perspective view of the clutch release attachment separated from the tractor.

Referring now more particularly to the accompanying drawings, in which like numerals indicate like parts, the numeral 5 designates generally a tractor of the Fordson type which includes a rear differential housing 6, which may be considered part of the tractor chassis. The rear axle 7 is journalled in this differential housing and, as is customary, mounts the traction wheels 8, only one of which is illustrated.

The clutch (not shown) by which the transmission of driving force to the traction wheels is controlled, is arranged to be disengaged by depression of a clutch pedal 9 which projects from the side of the differential housing 6 and extends forwardly to have its treadle portion 10 readily accessible to an operator or driver seated on the seat 11.

The implement to be drawn by the tractor, and which in the present illustration constitutes a plow 12, is connected to a hitch which includes a main draw bar 13 pivotally connected as at 14 to the lower portion of the differential housing, and a link 15 which serves to hold the frame of the plow or other implement upright.

Hydraulic lift mechanism (not shown) and mounted within the differential housing, is provided for raising and lowering the implement, the raising and lowering force being applied to the main draw bar through a tie rod, part of which is shown at 16.

The forward end of the link 15 is connected to a substantially T-shaped lever 17, the stem of which is pivoted to the differential housing as at 18. This T-shaped lever is also connected to a shaft 19 which extends into the differential housing to connect with the hydraulic lifting mechanism and effect a controlling function in consequence to in and out motion of the shaft 19.

The linkage, comprising the link 15, the lever 17 and the shaft 19, has a general back and forth motion imparted thereto by the normal tilting of the implement as it is drawn forwardly through the ground. Opposition to the forward motion of the implement causes a forward motion of this linkage, which is opposed by an overload spring 20 encircling the shaft 19 and confined between a solid wall of the differential housing and an abutment at the connection of the shaft 19 with the lever 17.

It is this back and forth motion of the link 15, the lever 17 and the shaft 19 which is utilized through the novel device of this invention to disengage the clutch upon the occurrence of an overload, which produces excessive movement of the connected linkage and excessive compression of the overload spring 20.

The actual clutch disengaging device, as stated, is in the form of an attachment readily applied to this type of tractor. It consists of a main support 21 in the form of a bar having holes 22 located to align with the front cap screws which secure a cover plate 23 to the side of the differential housing 6. Hence, by merely removing these two cap screws and replacing them with longer screws, the main supporting bar 21 is clamped to the side of the differential housing.

The bar 21 has its upper end rising to a point at least in line with the top of the differential housing and has a stop abutment 24 adjustably secured to its medial portion for a purpose to be hereinafter described.

The main supporting bar has the lower end of a toggle, indicated generally by the numeral 25, pivoted thereto as at 26. The toggle 25 comprises a pair of upper and lower levers 27 and 28 pivotally connected as at 29 at a point such that the upper end of the lower lever extends beyond their pivotal connection to engage a stop 30 fixed to the upper lever and limit relative movement between the levers beyond a point at which they are in straight alignment.

A tension spring 31, hooked to suitable supports at the upper and lower ends of the toggle yieldingly holds the toggle straight and also collapses the same upon tripping thereof by the application of initial collapsing force.

Being pivoted to the bottom of the main supporting bar, the toggle lies between the side of the differential housing and the clutch release pedal 9 in a position free from swinging movement toward and from the adjustable stop abutment 24.

At the pivotal connection of the two levers comprising the toggle, a spool-like arm 32 projects laterally across the plane of motion of the clutch release pedal 9 so that upon tripping of the toggle and its collapse produced by its spring, the clutch release pedal 9 will be depressed to disengage the clutch of the tractor.

Tripping of the toggle is effected by its striking the abutment 24, and as the disengagement of the clutch is to take place in consequence to an abnormal compression of the overload spring 20 by the connected linkage consisting of the link 15, the lever 17 and the shaft 19, the upper free end of the toggle is connected with this linkage.

For this purpose a second support 33 is secured to the tractor chassis. For the sake of convenience in mounting, this second support has holes 34 which align with the two cap screws by which the spring support of the seat 11 is fastened to the top of the differential housing. Hence, by removing these cap screws and replacing them with longer ones the second support 33 is conveniently secured to the tractor chassis.

Medially pivoted to this second support is a lever 35. One end of this lever is loosely pivotally connected as at 36 with a link 37 the forepart of which is pivoted as at 38 to the upper free end of the toggle.

The other end of the medially pivoted lever 35 is pivotally connected as at 39 to a connector 40 which reaches back over the overload spring 20.

A downwardly extending bifurcated end wall 41 on the connector embraces the connection between the shaft 19 and the lever 17 in a manner such that the ends of the bolt which connects the lever 17 and the shaft 19 bear against the end of the wall 41.

Consequently, sudden swinging movement of the lever 17 to compress the spring 20 also carries the connector 40 forwardly and this motion of the connector is transmitted through the medially pivoted lever 35 to the link 37 which pulls the toggle backwardly toward the abutment 24. Inasmuch as the position of the abutment 24 is adjustable, it is possible to set the range of free motion of the connected linkage which results from the constant fluctuation of the connector 40 with the lever 17 during normal operation.

However, upon the occurrence of an abnormal load on the tractor, resulting from the plow striking a root or other solid obstruction, the sudden forward motion of the lever 17 and compression of the spring 20 carries the connected linkage of the attachment far enough to bring the toggle against the stop abutment 24 and thus initiate collapse of the toggle and disengagement of the tractor clutch.

To facilitate resetting or straightening of the toggle, a handle 42 is formed on the forward end of the link 37 which, as clearly shown in Figure 1, is conveniently in position to be grasped by the operator or driver. A lifting force applied to the handle restores the clutch release to its "cocked" condition.

To insure the connector 40 following the lever 17 at all times, a tension spring 43 is connected between the upper end of the main supporting bar 21 and the adjacent end of the medially pivoted lever 35. The force of this spring pushes the connector back against the cross bolt by which the motion of the lever 17 is transmitted to the connector.

This spring also urges the straightened toggle away from the stop abutment 24, as will be readily apparent.

From the foregoing description, taken in connection with the accompanying drawings, it will be readily apparent that this invention provides a simple clutch releasing attachment capable of being applied to tractors by any farmer to thereby provide a safety factor now lacking in most farm tractors.

What I claim as my invention is:

1. A clutch disengaging attachment for tractors of the type having a clutch pedal mounted on the side of the chassis and having a hitch including an overload spring, one end of which is anchored and the other end of which moves in consequence to fluctuations of the load on the hitch, said attachment comprising: a support secured to the side of the chassis adjacent to the clutch pedal; a toggle having one end pivoted to the support and having its medial portion extending past the clutch pedal; means on the toggle adjacent to its medial portion engageable with the clutch pedal to depress the same upon collapsing of the toggle; a spring tending at all times to collapse the toggle; an abutment on the support engageable with the straightened toggle to effect collapsing of the toggle upon movement thereof toward the abutment beyond a predetermined point; and a connection between said toggle and the movable end of the overload spring operable to carry the toggle beyond said predetermined point toward the abutment in consequence to motion of the movable end of the overload spring caused by an abnormal load on the hitch.

2. A clutch disengaging attachment for tractors of the type having a clutch pedal mounted on the side of the chassis and having a hitch including an overload spring, one end of which is anchored and the other end of which moves in consequence to fluctuations of the load on the hitch, said attachment comprising: a support secured to the side of the chassis adjacent to the clutch pedal; a toggle having one end pivoted to the support and having its medial portion extending past the clutch pedal; means on the toggle adjacent to its medial portion engageable with the clutch pedal to depress the same upon collapsing of the toggle; a spring tending at all times to collapse the toggle; an abutment on the support engageable with the straightened toggle to effect collapsing of the toggle upon movement thereof toward the abutment beyond a predetermined point; a connection between said toggle and the movable end of the overload spring operable to carry the toggle beyond said predetermined point toward the abutment in consequence to motion of the movable end of the overload spring caused by an abnormal load on the hitch; and a handle connected with the toggle for straightening the same after its collapse.

3. A clutch disengaging attachment for tractors of the type having a clutch release pedal projecting from the side of its chassis and having a hitch including an overload spring one end of which is anchored to the chassis and the other end of which moves in consequence to fluctuations of the drag imposed by the load, said attachment comprising: a support secured to the side of the chassis adjacent to the clutch release pedal; a second support secured to the chassis near the overload spring; a spring loaded toggle pivoted to the first support and having its medial portion adjacent to the clutch release pedal; means on the spring loaded toggle operable on the clutch release pedal upon collapsing of the toggle for disengaging the clutch; an abutment on the first support in position to effect collapsing of the toggle upon movement of the toggle toward the abutment beyond a predetermined point; a lever medially pivoted to the second support; means for connecting one end of the lever to the movable end of the overload spring; and a link connecting the other end of said medially pivoted lever with the spring loaded toggle so as to translate motion of the movable end of the spring produced by fluctuations of the drag imposed by the load into movement of the spring loaded toggle toward and from the abutment in such a manner that the imposition of an overload on the tractor effects tripping of the toggle and release of the clutch.

4. A clutch disengaging attachment for tractors of the type having a clutch release pedal projecting from the side of its chassis and having a hitch including an overload spring one end of which is anchored to the chassis and the other end of which moves in consequence to fluctuations of the drag imposed by the load, said attachment comprising: a support secured to the side of the chassis adjacent to the clutch release pedal; a second support secured to the chassis near the overload spring; a spring loaded toggle pivoted to the first support and having its medial portion adjacent to the clutch release pedal; means on the spring loaded toggle operable on the clutch release pedal upon collapsing of the toggle for disengaging the clutch; an abutment on the first support in position to effect collapsing of the toggle upon movement of the toggle toward the abutment beyond a predetermined point; a lever medially pivoted to the second support; means for connecting one end of the lever to the movable end of the overload spring; a link connecting the other end of said medially pivoted lever with the spring loaded toggle so as to translate motion of the movable end of the spring produced by fluctuations of the drag imposed by the load into movement of the spring loaded toggle toward and from the abutment in such manner that the imposition of an overload on the tractor effects tripping of the toggle and release of the clutch; and a spring connecting the medially pivoted lever and the first mentioned support for holding the connector against the abutment it engages at the movable end of the spring.

5. A clutch disengaging attachment for tractors of the type having a clutch release pedal projecting from the side of its chassis and having a hitch including an overload spring one end of which is anchored to the chassis and the other end of which moves in consequence to fluctuations of the drag imposed by the load, said attachment comprising: a support secured to the side of the chassis adjacent to the clutch release pedal; a second support secured to the chassis near the overload spring; a spring loaded toggle pivoted to the first support and having its medial portion adjacent to the clutch release pedal; means on the spring loaded toggle operable on the clutch release pedal upon collapsing of the toggle for disengaging the clutch; an abutment on the first support in position to effect collapsing of the toggle upon movement of the toggle toward the abutment beyond a predetermined point; a lever medially pivoted to the second support; means for connecting one end of the lever to the movable end of the overload spring; a link connecting the other end of said medially pivoted lever with the spring loaded toggle so as to translate motion of the movable end of the spring produced by fluctuations of the drag imposed by the load into movement of the spring loaded toggle toward and from the abutment in such a manner that the imposition of an overload on the tractor effects tripping of the toggle and release of the clutch; and a handle formed on the connecting link and readily accessible to the driver of the tractor for straightening the toggle after its collapse.

6. A device of the character described comprising: a main support; a pair of pivotally connected levers forming a toggle; means pivotally connecting one end of said toggle to the main support; a tension spring connecting the outer ends of the toggle levers; stop means on the toggle levers to react against the spring force and hold the toggle straight until tripped by initial relative pivotal motion of the levers; an abutment mounted on the main support in position to effect such initial relative pivotal motion of the toggle levers upon movement of the straightened toggle toward the abutment beyond a predetermined point; a second support; a lever medially pivoted to said second support; a connector pivoted to one end of said medially pivoted lever and connectable to a motion producing source; and a link connecting the other end of the medially pivoted lever with the free end of the toggle so that movement of the connector by the motion producing source is translated into motion of the toggle toward and from the abutment when the two supports are held against movement with respect to each other and in a predetermined relationship.

7. A device of the character described comprising: a main support; a pair of pivotally connected levers forming a toggle; means pivotally connecting one end of said toggle to the main support; a tension spring connecting the outer ends of the toggle levers; stop means on the toggle levers to react against the spring force and hold the toggle straight until tripped by initial relative pivotal motion of the levers; an abutment mounted on the main support in position to effect such initial relative pivotal motion of the toggle levers upon movement of the straightened toggle toward the abutment beyond a predetermined point; a second support; a lever medially pivoted to said second support; a connector pivoted to one end of said medially pivoted lever and connectable to a motion producing source; a link connecting the other end of the medially pivoted lever with the free end of the toggle so that movement of the connector by the motion producing source is translated into motion of the toggle toward and from the abutment when the two supports are held against movement with respect to each other and in a predetermined relationship; and a spring for yieldingly urging the toggle away from the abutment.

8. A clutch tripping attachment for tractors having a hitch to which the load is connected and which includes a part movable with relation to the tractor as the load varies, said attachment comprising: a pair of pivotally connected levers forming a toggle; means pivotally connecting one end of said toggle to a support on the tractor; means on the toggle limiting relative pivotal motion between the toggle levers in one direction so as to establish the potentially operative position of the toggle; a tension spring connected with the toggle to hold the same in its potentially operative position and to effect forceful collapse of the toggle upon initial relative pivotal motion between the toggle levers in the opposite direction; initial toggle collapsing means engageable with the toggle upon relative motion between it and the toggle toward each other beyond a predetermined degree for effecting initial relative pivotal motion between the toggle levers in a direction to collapse the toggle; means connected with the movable part of the hitch to effect such relative motion between the toggle and said initial toggle collapsing means; and means on the toggle operable upon part of the clutch controlling mechanism of the tractor to disengage the tractor clutch upon collapsing of the toggle.

BALDWIN KUNTZ.